(12) United States Patent
Parmeter et al.

(10) Patent No.: US 10,672,532 B2
(45) Date of Patent: Jun. 2, 2020

(54) MAKING AN ENHANCED MAGNET WIRE INSULATION SUITED FOR AN ELECTRIC SUBMERSIBLE MOTOR APPLICATION

(71) Applicant: Halliburton Energy Services, Inc., Houston, TX (US)

(72) Inventors: Larry Parmeter, Broken Arrow, OK (US); Brett Leamy, Claremore, OK (US); David Lunk, Big Cabin, OK (US); Keith Johnson, Claremore, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 114 days.

(21) Appl. No.: 15/701,164

(22) Filed: Sep. 11, 2017

(65) Prior Publication Data
US 2017/0372813 A1    Dec. 28, 2017

Related U.S. Application Data

(63) Continuation-in-part of application No. 13/834,270, filed on Mar. 15, 2013, now Pat. No. 9,800,110.
(Continued)

(51) Int. Cl.
*H01F 7/06* (2006.01)
*H01B 3/30* (2006.01)
(Continued)

(52) U.S. Cl.
CPC ............. *H01B 3/306* (2013.01); *H01B 3/427* (2013.01); *H01B 7/292* (2013.01); *H01B 13/145* (2013.01);
(Continued)

(58) Field of Classification Search
CPC ........ H01B 3/306; H01B 3/427; H01B 7/292; H01B 13/145; H02K 3/44; H02K 3/46; H02K 5/132; H02K 15/10; H02K 15/12
See application file for complete search history.

(56) References Cited

U.S. PATENT DOCUMENTS 4,833,354 A   5/1989  Miller
5,861,071 A *  1/1999  McBane ............... H01F 41/068
                                                         156/202
(Continued)

FOREIGN PATENT DOCUMENTS

CN      201655368 U    11/2010
JP      2006080221 A   11/1994

OTHER PUBLICATIONS

PCT Application Serial No. PCT/US2018/042217, International Search Report, dated Nov. 5, 2018, 3 pages.
(Continued)

*Primary Examiner* — Paul D Kim
(74) *Attorney, Agent, or Firm* — Gilliam IP PLLC

(57) ABSTRACT

A system and method for enhanced magnet wire insulation is described. The method comprises a sequence of operations to create an enhanced magnet wire insulation suitable for use in temperatures of about 550° Fahrenheit. A magnet copper wire is wrapped with a polyimide wrap and subsequently wrapped with an organic polymer thermoplastic (e.g., PEEK). The polyimide wrap is applied while the magnet copper wire is around a spool to create a wrapped magnet wire. The wrapped magnet wire can be heated using an induction coil in a metal tube bolted to an extruder to remove moisture and to enable adding the layer of organic polymer thermoplastic. The metal tube can be held at a partial vacuum to augment moisture removal of the wrapped magnet wire prior to running the wrapped magnet wire through the extruder which adds the organic polymer ther-
(Continued)

moplastic layer. This method produces an enhanced magnet wire suitable for a wide range of temperatures.

17 Claims, 5 Drawing Sheets

Related U.S. Application Data

(60) Provisional application No. 61/636,003, filed on Apr. 20, 2012.

(51) Int. Cl.
| | | |
|---|---|---|
| *H01B 3/42* | (2006.01) | |
| *H01B 7/29* | (2006.01) | |
| *H02K 3/44* | (2006.01) | |
| *H02K 5/132* | (2006.01) | |
| *H02K 3/46* | (2006.01) | |
| *H01B 13/14* | (2006.01) | |
| *H02K 15/10* | (2006.01) | |
| *H02K 15/12* | (2006.01) | |

(52) U.S. Cl.
CPC .............. *H02K 3/44* (2013.01); *H02K 3/46* (2013.01); *H02K 5/132* (2013.01); *H02K 15/10* (2013.01); *H02K 15/12* (2013.01); *Y10T 29/49009* (2015.01)

(56) References Cited

U.S. PATENT DOCUMENTS

| | | | | |
|---|---|---|---|---|
| 7,679,242 | B2 * | 3/2010 | Parmeter | F04D 13/10 |
| | | | | 310/184 |
| 8,604,656 | B2 * | 12/2013 | Goertzen | F04D 13/10 |
| | | | | 29/596 |
| 9,472,987 | B1 * | 10/2016 | Hall | H02K 3/12 |
| 9,800,110 | B2 * | 10/2017 | Parmeter | H02K 3/30 |
| 2013/0278117 | A1 | 10/2013 | Parmeter et al. | |
| 2014/0152155 | A1 | 6/2014 | Flett et al. | |

OTHER PUBLICATIONS

French Application Serial No. 1856783; Office Action; dated Oct. 16, 2018, 5 pages.
PCT Application Serial No. PCT/US2018/042217, Written Opinion, dated Nov. 5, 2018, 8 pages.
CA Application Serial No. 2,980,179, Office Action, dated Apr. 30, 2019, 4 pages.
GCC Application Serial No. 2018-35754; First Exam Report, dated Mar. 19, 2020, 5 pages.

* cited by examiner

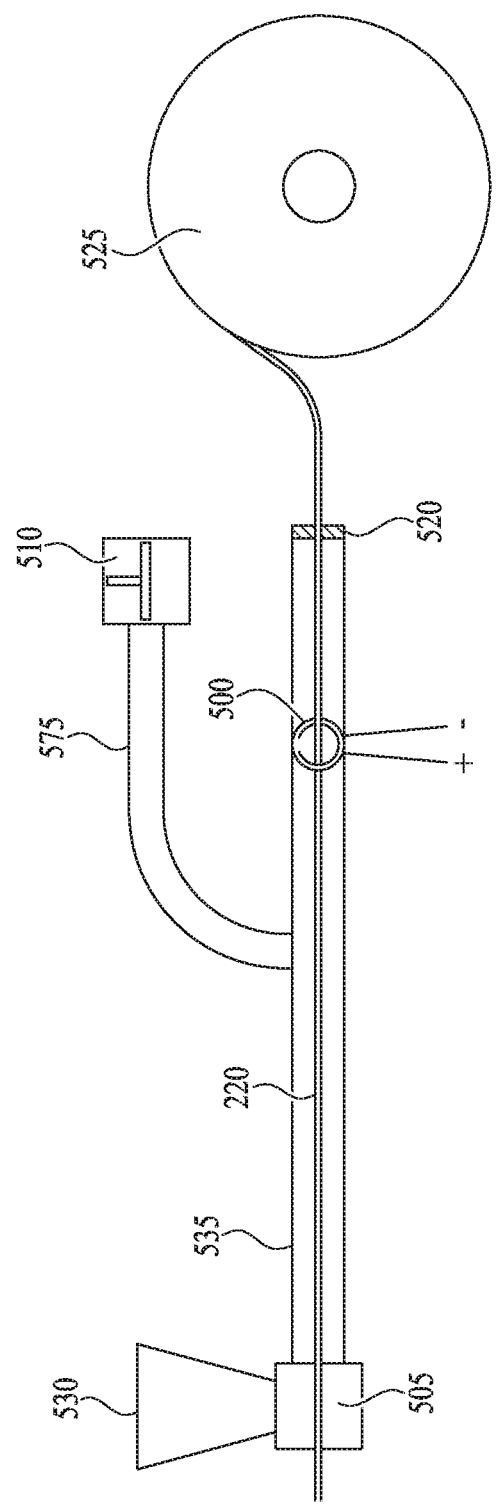

MAKING AN ENHANCED MAGNET WIRE INSULATION SUITED FOR AN ELECTRIC SUBMERSIBLE MOTOR APPLICATION

CROSS REFERENCE TO RELATED APPLICATIONS

This application is a continuation in part of U.S. application Ser. No. 13/834,270 to Parmeter et al., filed Mar. 15, 2013, now U.S. Pat. No. 9,800,110, and entitled "SYSTEM AND METHOD FOR ENHANCED MAGNET WIRE INSULATION," which claims the benefit of U.S. Provisional Application No. 61/636,003 to Parmeter et al., filed Apr. 20, 2012 and entitled "SYSTEM AND METHOD FOR ENHANCED MAGNET WIRE INSULATION," each of which are hereby incorporated by reference in their entireties.

BACKGROUND OF THE INVENTION

1. Field of the Invention

Embodiments of the invention described herein pertain to the field of magnet wire. More particularly, but not by way of limitation, one or more embodiments of the invention enable a system and method for enhanced magnet wire insulation for electric submersible pump applications.

2. Description of the Related Art

Currently available magnet wire is not appropriate for some motor applications. Particularly, magnet wire used in motors for oil or gas pumping applications should be exceptionally reliable. When a motor is used in an oil or gas well, a wire failure or short is especially costly as the motor is deep in the ground. If the insulation of the magnet wire in the motor forms cracks, these cracks can cause premature failure of the motor.

In the case of an electric submersible pump (ESP), a failure of the motor can be catastrophic as it means having to remove the unit from the well for repairs. ESP assemblies in particular require that the magnet wire used be capable of surviving the high temperatures deep below ground. In addition, ESP pumps may sometimes leak, allowing some water to enter the motor. A magnet wire that is appropriately waterproof so as to prevent a short when exposed to such leakage would be an advantage in all types of pumping applications. Finally, magnet wires often are damaged when they are transported, incurring breaks, nicks or pinholes. This damage decreases the life expectancy of the wire. A magnet wire with increased durability during transportation would be an advantage in all types of magnet wire applications.

Currently available magnet wire is sometimes insulated with polyimide film, for example Kapton® (a trademark of E. I. Du Pont De Nemours and Company) tape. Polyimide film is a type of synthetic polymeric resin of a class resistant to high temperatures, wear, and corrosion, used primarily as a coating or film on a substrate substance. While for brevity this description uses Kapton® as an example of polyimide film, nothing herein limits the invention to the use of a particular polyimide film such as Kapton® tape. While Kapton® has the highest dielectric strength of any wire insulation currently available, it does have inherent weaknesses. Kapton® readily takes on water (is hydroscopic) and then degrades rapidly. The adhesive used to attach Kapton® tape to the wire may also delaminate at the extreme high temperatures of deep wells. Magnet wire wrapped with Kapton tape is also prone to damage during transportation.

Another currently available insulation for magnet wire is organic polymer thermoplastic insulation, such as PEEK (polyetheretherketone). While PEEK has sufficient dielectric strength at room temperature, it drops off rapidly when used above 500° F. Motor temperatures in high temperature wells may reach in excess of 550° F. Thus, PEEK is also not ideal wire insulation for use in ESP motors.

Therefore, there is a need for a system and method to produce enhanced magnet wire insulation that is more waterproof, durable during shipping and also reliable at the high temperatures for ESP applications.

BRIEF SUMMARY OF THE INVENTION

One or more embodiments of the invention enable a system and method for enhanced magnet wire insulation for ESP applications.

A system and method for enhanced magnet wire insulation is described. An illustrative embodiment of a method of making an enhanced magnet wire insulation suited for an electric submersible motor application includes drawing copper magnet wire to size, cleaning the copper magnet wire, pulling the copper magnet wire through a polyimide wrap machine to produce wrapped copper magnet wire and placing the wrapped copper magnet wire around a spool, heating the wrapped copper magnet wire by unspooling the wrapped magnet wire through a tube including an induction coil, removing moisture from the heated, wrapped copper magnet wire by creating at least a partial vacuum inside the tube, redrawing the wrapped copper magnet wire through an extrusion mold after moisture is removed, applying molten PEEK to the wrapped copper magnet wire to produce enhanced magnet wire, and winding the enhanced magnet wire into an induction motor to be used to operate an electric submersible pump. In some embodiments, heating the wrapped magnet wire includes heating the wrapped magnet wire to a temperature of 300° F. In certain embodiments, heating the wrapped magnet wire includes sliding the wrapped magnet wire through an inside of the induction coil. In some embodiments, the at least partial vacuum is created inside the tube by a vacuum pump coupled to an inside of the tube. In certain embodiments, the at least partial vacuum is in a space between the wrapped magnet wire and an inner diameter of the tube. In some embodiments, the method further includes closing an end of the tube with a rubber plug to at least partially prevent air from entering the tube. In certain embodiments, winding the enhanced magnet wire into the induction motor further includes winding the enhanced magnet wire through open slots of a stator of the induction motor, wherein the open slots have empty space around the enhanced magnet wire. In some embodiments, the method further includes cooling the induction motor by convection by allowing motor oil to flow through the empty space in the open slots around the enhanced magnet wire. In certain embodiments, the wound enhanced magnet wire is suited for use in temperatures of about 550° Fahrenheit when the induction motor is used to operate the electric submersible pump.

An illustrative embodiment of a system for making an enhanced magnet wire insulation suited for an electric submersible motor application includes a PEEK wire extruder, a tube extending between the PEEK wire extruder and a spool including polyimide-wrapped copper magnet wire, the tube including an induction coil inside the tube, a vacuum pump operatively coupled to the inside of the tube, a spool-side of the tube including a plug, the plug having an aperture extending through the plug, wherein the polyimide-wrapped copper magnet wire extends from the spool, through the aperture in the plug, through the tube, and into the PEEK wire extruder. In some embodiments, the tube has at least a partial vacuum inside the tube between the polyimide-wrapped copper magnet wire and an inner diameter of the tube. In certain embodiments, the polyimide-wrapped copper magnet wire extends through an inside of the induction coil as the polyimide-wrapped copper magnet wire extends through the tube.

The induction motor of the system of an illustrative embodiment may comprise a variety of types of motors known in the art for use as electric submersible motors. For example, a three phase "squirrel cage" induction motor well known in the art, as well as permanent magnet (PM) motors. Both these and other motors suitable for use with an ESP assembly may benefit from the enhanced magnet wire insulation of the system and method of the invention.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The above and other aspects, features and advantages of the invention will be more apparent from the following more particular description thereof, presented in conjunction with the following drawings wherein:

FIG. 5 is a schematic representation of an induction coil heating system of an illustrative embodiment.

Figure 1:
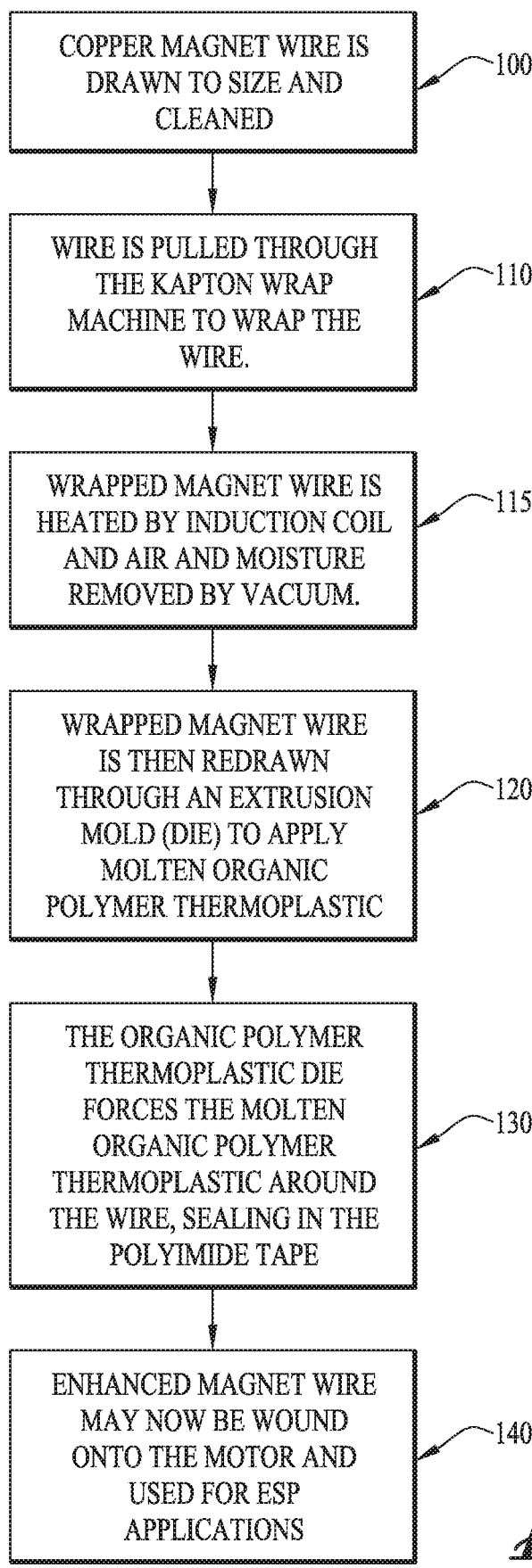
FIG. 1 is a flowchart illustrating an exemplary method of making enhanced magnet wire insulation for use in an electric submersible pump (ESP) system.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A system and method for enhanced magnet wire insulation will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a wire includes one or more wires.

"Coupled" refers to either a direct connection or an indirect connection (e.g., at least one intervening connection) between one or more objects or components. The phrase "directly attached" means a direct connection between objects or components.

One or more embodiments of the invention provide a system and method for enhanced magnet wire insulation for use in electric submersible pump (ESP) applications. While the invention is described in terms of an oil or gas pumping embodiment, nothing herein is intended to limit the invention to that embodiment.

The system of the invention comprises an ESP system. The ESP system of an illustrative embodiment comprises a magnet wire 250 (shown in FIG. 2C), enhanced insulation for the magnet wire 230, 240 (shown in FIG. 2C), a pump 420 (shown in FIG. 4) and an electrical submersible motor 300 (shown in FIG. 3). FIG. 1 illustrates one or more methods of making enhanced magnet wire insulation for use in an ESP system. At step 100, copper magnet wire 250 may be drawn to size and cleaned using methods known in the art. At step 110, the copper magnet wire 250 may be pulled through a polyimide film (tape) wrap machine to wrap the copper magnet wire 250. The polyimide tape 230 may contain adhesive on its surface or the adhesive may be separately applied. This adhesive makes contact with the magnet wire 250 and may be heat activated, providing a bond to the magnet wire 250. One type of polyimide tape 230 that may be used is poly(4,4'-oxydiphenylene-pyromellitimide), also known as Kapton®. Various types of polyimide tape 230 may be suitable, such as Kapton® tape types FN, HN and HPP-ST, for example. Other polyimide tapes having similar chemical properties may also be used.

While polyimide tape 230 has the highest dielectric strength of any wire insulation currently available alone, it has significant mechanical disadvantages when used in ESP applications. First, polyimide tape 230 is hydroscopic (it readily takes on water) and degrades in the presence of water. In a deep well, such as an oil or gas well, it is possible for small amounts of water to enter the motor, leaving the polyimide tape insulation 230 vulnerable to a short, which is a critical system failure. As the ESP motor is deep within an oil well, such failures are catastrophic. Another known problem with polyimide tape insulation 230 is that it may delaminate at extremely high temperatures, such as above 300 degrees Fahrenheit. Additionally, transporting magnet wire 250 with polyimide insulation 230 may cause nicks or pinholes in the polyimide insulation 230, reducing its lifespan and effectiveness. Further, excessive vibration may also weaken the adhesive of the polyimide tape 230. This mechanical disadvantage of polyimide may cause the tape to come loose and cause a direct short in the motor 300.

Finally, if the wire 250 is not extremely clean when the polyimide tape 230 is applied, the adhesive will not adhere properly and the polyimide 230 may be easily damaged during winding, which may also lead to a short in the winding.

To overcome these and other disadvantages of the polyimide tape 230, for example, at step 120 the polyimide wrapped magnet wire 250 is then redrawn through an extrusion mold (die) to apply an organic polymer thermoplastic 240, such as molten PEEK (polyetheretherketone) to the wrapped wire, creating a twice-insulated wire 220. Other organic polymers thermoplastics having similar chemical properties as PEEK may also be employed.

Care must be taken to prevent air and moisture from being trapped between the polyimide tape 230 and polymer thermoplastic 240 layers. Polyimide tape 230 contains a very small percentage of moisture due to its chemistry. When polyimide tape 230 is heated in motor 300, a problem that may arise is the moisture contained in polyimide tape 230 boils out and may cause polymer thermoplastic layer 240 to blister or swell. The blistering and/or swelling may undesirably cause blowouts in polymer thermoplastic 240. To address this problem, at heating step 115, the polyimide 230 wrapped magnet wire 250 may be heated to 300° F. using induction coil 500 (shown in FIG. 5), prior to magnet wire 250 entering the polymer thermoplastic 240 extruding mold (extruder) 505 (shown in FIG. 5). All or substantially all the moisture may therefore be boiled out of polyimide tape 230 prior to extrusion of polymer thermoplastic 240, such as PEEK, over polyimide tape 230 layer. Wrapped magnet wire 250 may be placed around spool 525 (shown in FIG. 5) to facilitate handling of the thousand-foot-long wrapped magnet wire 250.

FIG. 5 illustrates an induction coil heating system of illustrative embodiments. Induction coil 500 may be placed inside metal tube 535 that is bolted to extruder 505. Tube 535 may be about four feet in length and three inches in diameter. Induction coil 500 may be an electrical resistance coil about one inch in length that plugs into a 220V outlet. Induction coil 500 may extend around the inner diameter of tube 335, surrounding magnet wire 250 when magnet wire 250 is fed through the inside of tube 535. The entrance of tube 535 on the spool-side of tube 535 may include rubber plug 520 with a central aperture just large enough for wrapped magnet wire 250 to pass through plug 520 and into tube 535. Rubber plug 520 may prevent air from entering tube 535. In an illustrative example, tube 535 may be about three inches in diameter for a wrapped magnet wire 250 of about 0.09-0.125 inches in diameter. Tube 535 with a larger diameter than wrapped magnet wire 250 may provide space inside tube 535 that allows for a good vacuum without pulling in outside air. A small vacuum pump 510 may be coupled to tube 535 by hose 575 to remove air and moisture from inside tube 535 and assist with enhanced moisture removal from polyimide tape 230. Only a partial vacuum may be needed to achieve the desired moisture removal. Polyimide 230 wrapped magnet wire 250 may be fed into tube 535 from spool 525. Spool 525 may hold a wrapped magnet wire 250 thousands of feet long. As polyimide 230 wrapped magnet wire 250 passes through the inside of induction coil 500 and/or tube 535, moisture may be removed from polyimide layer 230. The wrapped magnet wire 250, with moisture removed, may then proceed into extruder 505 for addition of PEEK insulation layer 240.

Returning to FIG. 1, at step 130, the PEEK die forces the molten organic polymer thermoplastic 240 around the polyimide tape layer 230, sealing in the polyimide tape 230 and creating an enhanced magnet wire 220. In an illustrative example, PEEK pellets may be placed into pellet hopper 530 for extrusion of polymer thermoplastic 240 over polyimide layer 230 in extruder 505. At step 140, enhanced magnet wire may now be wound onto motor 300 in a conventional fashion and used for ESP applications.

In the method of an illustrative embodiment it should be noted that it is possible to splice together two pieces of enhanced magnet wire 220 and still have a seamless, homogenous insulation coating over the underlying polyimide tape 230. To do so, a PEEK shrink tube, for example, may be slipped over one of the enhanced magnet wires 220 to be spliced. Next, the ends of the two enhanced magnet wires 220 may be forced together using an appropriate wire press and dies with sufficient force that it cold welds the enhanced magnet wires 220 together. The resulting flash may be filed smooth and polyimide tape 230 may be applied over the bare wire. The PEEK shrink tube may then be slipped over (and centered) over the splice. Finally, a small "clam shell" heater or similar device may be placed around the splice. The heater may then be turned on until the temperature near the splice reaches 700° F. The heater should then be immediately turned off and removed. The 700° F. temperature is significant because at that temperature the PEEK shrink tube (and those with other similar chemical properties) (and PEEK on the wire) will solidify and fuse together, creating a seamless splice.

Figure 2A:
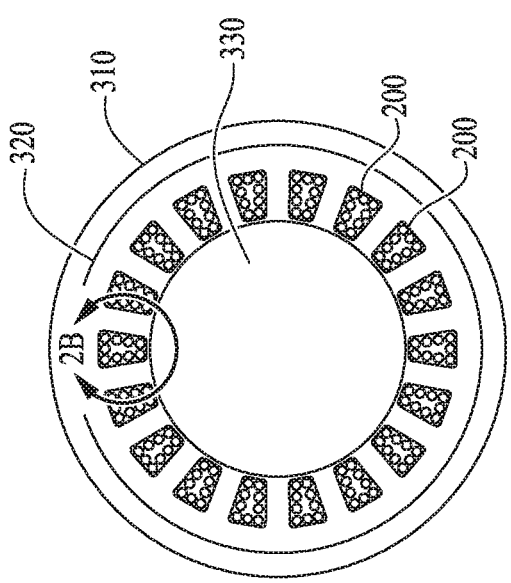
FIG. 2A illustrates a cross sectional view taken along line 2A-2A of FIG. 3 of an ESP motor containing a number of slots comprising the exemplary enhanced magnet wires employing the insulation of one or more illustrative embodiments.

FIG. 2A illustrates in detail one or more arrangements of copper wire windings insulated with the enhanced magnet wire insulation of illustrative embodiments. FIG. 2A is a cross section along line 2A-2A of FIG. 3 and shows a cross sectional view of stator 320 encompassing rotor assembly 330. Organic polymer thermoplastics 240, such as for example PEEK, may be used to create a wire insulation that is not affected by water and is without bonding issues. Organic polymer thermoplastics 240 such as PEEK have a low coefficient of friction that provides an advantage when winding stator 320. PEEK may also stand up well to transport and winding because it has no seams or wraps, so it is not easily damaged during shipping or winding. PEEK alone, however, is not advantageous for magnet wire insulation for ESP applications as its dielectric strength drops off rapidly above 500° F.

Enhanced magnet wire 220 of illustrative embodiments combines the advantages of greatly improved quality and reliability of insulation. Enhanced magnet wire 220 will have a tough and smooth surface such that varnish or epoxy filling may no longer be required to fill stator slots 200, as chaffing may no longer be a concern. In addition, this advantage saves time and cost in production. The lower coefficient of friction of an organic polymer thermoplastic 240 may improve the winding process, for example by making the insertion of the enhanced magnet wire 220 into the stator slots 200 easier, reducing the potential of damage to the wire during the winding process and reducing physical effort required by personnel in the winding process. The resultant enhanced magnet wire 220 may importantly be more water proof than wire insulated with either prior insulation alone. When combined into a system with a three-phase induction, PM or other motor 300 for ESP applications, this method produces an improved system for lifting oil or gas from a production well. This method, and other embodiments thereof as contemplated by those of skill in the art using these materials, may produce enhanced magnet wire 220 that may then be wound onto the motor 300 and used for ESP applications with increased reliability over previous solutions.

Figure 2B:
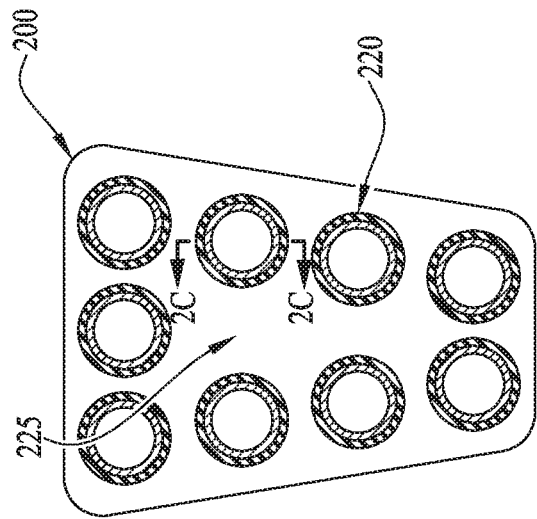
FIG. 2B shows detail of a single wire slot of FIG. 2A comprising exemplary enhanced magnet wires employing the insulation of an illustrative embodiment.

FIG. 2B illustrates the detail of an exemplary slot of FIG. 2A. Exemplary enhanced magnet wire 220 is shown in slot 200 in FIG. 2B. Magnet wire 250 is shown protected by two layers of insulation, as in one or more illustrative embodiments, to form enhanced magnet wire 220. Enhanced magnet wire 220 may be protected using a combination of layers of the enhanced magnet wire insulation of one or more embodiments of the invention. Organic polymer thermoplastic 240, such as PEEK, may provide improved abrasion resistance to magnet wire 220. As a result, slots 200 may be "open" without varnish or epoxy filling space 225 in slots 200 that is not taken up by enhanced magnet wire 220. Thus, slots 200 may include voids that allow motor oil to move freely through spaces 225 in slots 200. The motor oil moving through open slots 200 may allow motor 300 to cool by convection, causing motor 300 to run cooler than when an insulator such as varnish or epoxy fills slots 200.

Figure 2C:
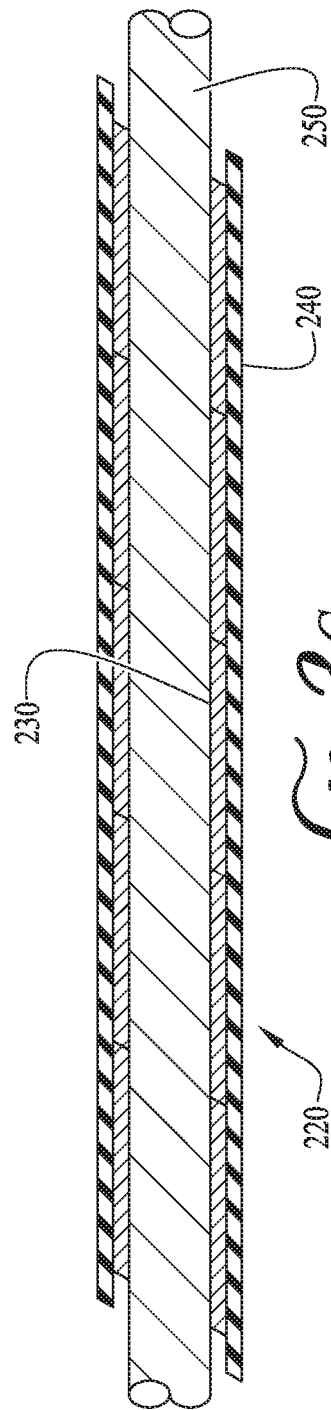
FIG. 2C shows a cross sectional view taken along line 2C-2C of FIG. 2B illustrating a combination of insulation layers of an exemplary magnet wire.

FIG. 2C shows a cross section across line 2C-2C of FIG. 2B of enhanced magnet wire 220. Copper magnet wire 250 is encased in polyimide tape 230, which is itself encased within organic polymer thermoplastic 240 to produce one or more embodiments of the enhanced magnet wire 220 of illustrative embodiments. Illustrative embodiments of enhanced magnet wire 220 may be suitable for use in temperatures of 550° F. and/or about 550° F., for example when motor 300 is used to operate electric submersible pump 420 in a downhole oil and/or gas well. The advantages of the enhanced insulation and the method and system described herein are not limited to a single layer of each type of insulation and one of ordinary skill in the art could contemplate logical extensions thereof, all of which are embodiments of the invention.

Figure 3:
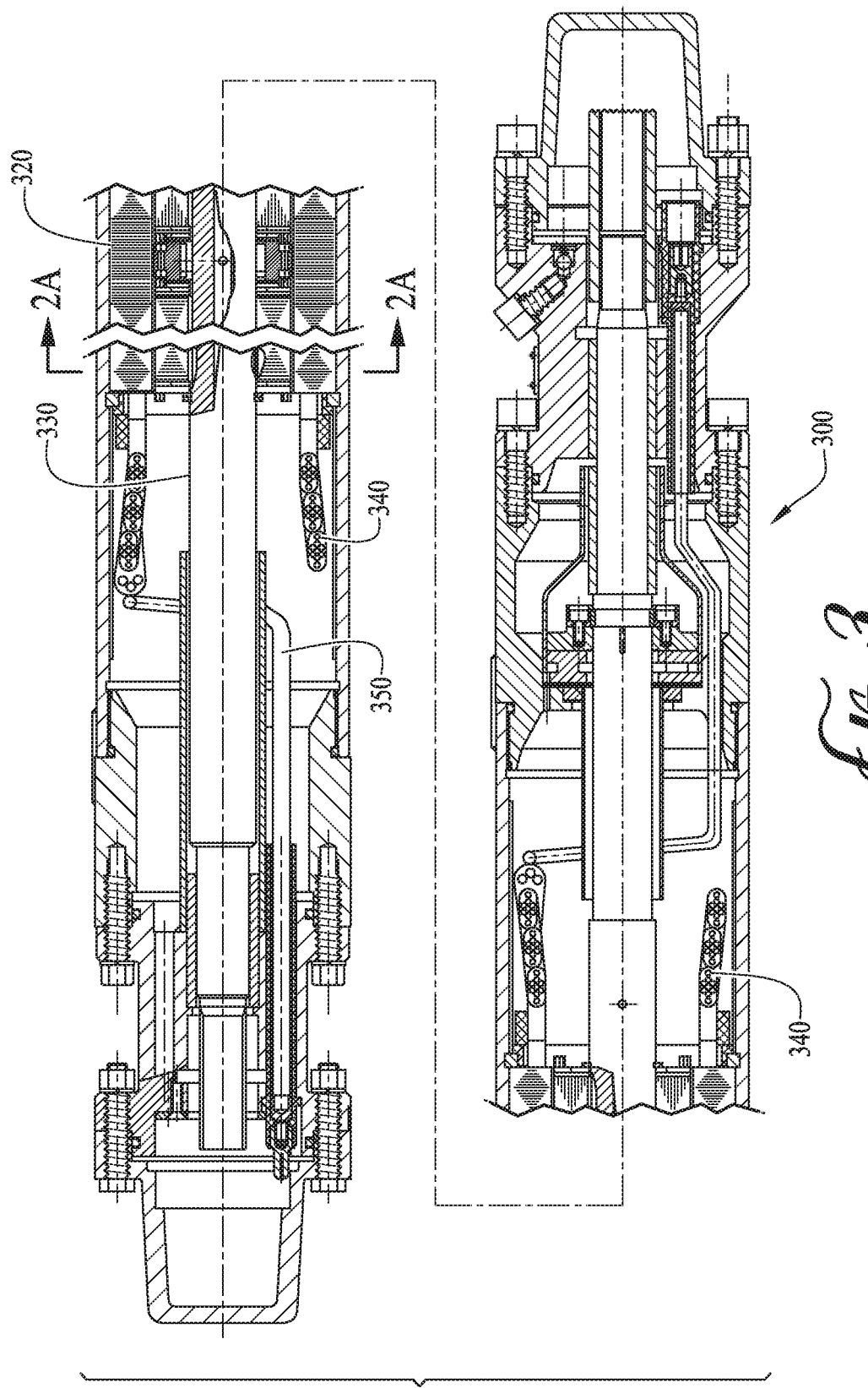
FIG. 3 illustrates an exemplary ESP three-phase induction motor for use in one or more illustrative embodiments.

FIG. 3 illustrates an exemplary ESP employing three-phase induction motor 300 for use in the system of illustrative embodiments. While the embodiments are not limited to use in three-phase induction motor 300, such a motor may be used in the system of the invention to enhance the advantages of the enhanced magnet wire 220 insulation. Three-phase induction motor 300 of the system of the invention may be, for example, a three-phase "squirrel cage" induction motor that is well known in the art. In some embodiments, the enhanced magnet wire 220 may be hand-wound on motor 300. Motor 300 of the system of the invention may operate from 15 to 1,000 horsepower, though the invention is not limited to this example. End coils 340 and main lead wire 350 are also shown. Main lead wire 350 connects to power cable 470 (shown in FIG. 4) for motor 300.

Figure 4:
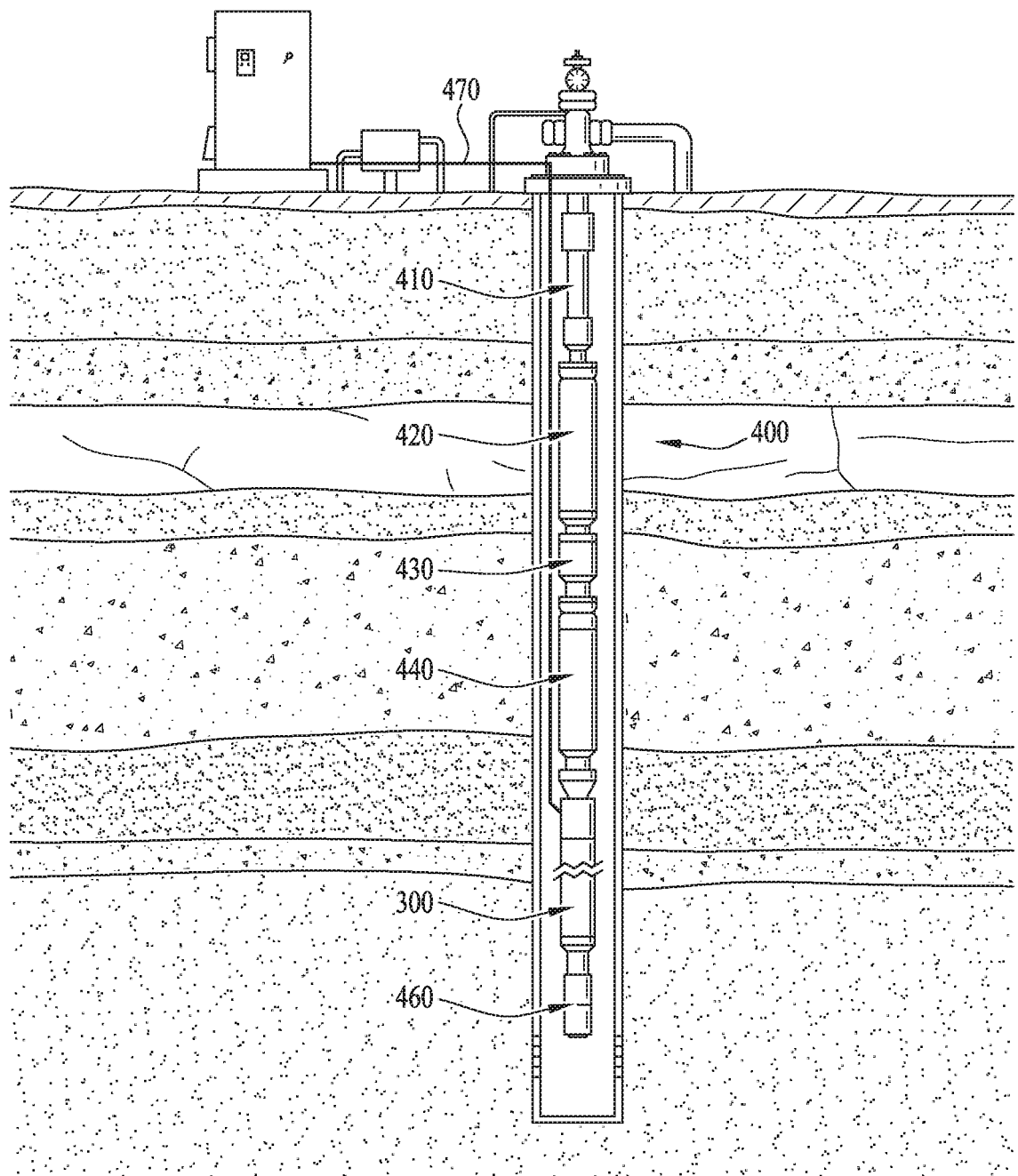
FIG. 4 graphically illustrates an exemplary ESP assembly deployed underground, the ESP comprising one or more embodiments of the enhanced magnet wire of an illustrative embodiment.

FIG. 4 provides a graphic illustration an exemplary ESP system 400 arranged to pump gas and/or oil and making use of the enhanced magnet wire 220 insulation of illustrative embodiments. As illustrated, the system further comprises a power cable 470, production string 410, multistage centrifugal pump 420, gas separator (not shown), intake 430, one or more seals 440 (motor protectors), downhole sensors 460, and motors such as motor 300 utilizing enhanced magnet wire 220. Casing sizes for the ESP illustrated may range from about 4.5 inches to 9 inches outer diameter, though illustrative embodiments are not limited to these examples.

The run life of ESP system 400 may be directly related to the quality and reliability of power cable 470. Power cables 470 for the system of the invention may be round or flat and configured to function in temperatures ranging from around −60° F. to about 450° F. Power cables of the system should provide extreme durability and reliability in conditions including resistance to decompression and fatigue with corrosion-resistant barriers that resist fluids and gas. Cables manufactured to ISO 9001 standards may be preferred in one or more illustrative embodiments.

The system of illustrative embodiments may alternatively comprise a permanent magnet (PM) motor. PM motors use a wound stator that may benefit from the enhanced insulated magnet wire described herein. Such motors are well known in the art. Other motors suitable for ESP applications may also be used as part of the system of illustrative embodiments.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. A method of making an enhanced magnet wire insulation suited for an electric submersible motor application, the method comprising:
    drawing a copper magnet wire to size;
    cleaning the copper magnet wire;
    pulling the copper magnet wire through a polyimide wrap machine to produce a wrapped magnet wire and placing the wrapped magnet wire around a spool;
    heating the wrapped magnet wire by unspooling the wrapped magnet wire through a tube comprising an induction coil;
    removing moisture from the heated, wrapped magnet wire by creating at least a partial vacuum inside the tube;
    redrawing the wrapped magnet wire through an extrusion mold after the moisture is removed,
    applying molten PEEK to the wrapped magnet wire to produce an enhanced magnet wire; and
    winding the enhanced magnet wire into an induction motor to be used to operate an electric submersible pump.

2. The method of claim 1, wherein heating the wrapped magnet wire comprises heating the wrapped magnet wire to a temperature of 300° F.

3. The method of claim 1, wherein heating the wrapped magnet wire comprises sliding the wrapped magnet wire through an inside of the induction coil.

4. The method of claim 1, wherein the at least partial vacuum is created inside the tube by a vacuum pump coupled to an inside of the tube.

5. The method of claim 4, wherein the at least partial vacuum is in a space between the wrapped magnet wire and an inner diameter of the tube.

6. The method of claim 1, further comprising closing an end of the tube with a rubber plug to at least partially prevent air from entering the tube.

7. The method of claim 1, wherein winding the enhanced magnet wire into the induction motor further comprises winding the enhanced magnet wire through open slots of a stator of the induction motor, wherein the open slots have empty space around the enhanced magnet wire.

8. The method of claim 7, further comprising cooling the induction motor by convection by allowing motor oil to flow through the empty space in the open slots around the enhanced magnet wire.

9. The method of claim 1, wherein the wound enhanced magnet wire is suited for use in temperatures of about 550° Fahrenheit when the induction motor is used to operate the electric submersible pump.

10. A method comprising:
pulling a magnet wire through a polyimide wrap machine to produce a wrapped magnet wire;
heating the wrapped magnet wire in a tube comprising an induction coil;
removing moisture from the heated, wrapped magnet wire by creating at least a partial vacuum inside the tube;
redrawing the wrapped magnet wire through an extrusion mold after the moisture is removed;
applying organic polymer thermoplastic to the wrapped magnet wire to produce an enhanced magnet wire; and
winding the enhanced magnet wire into an induction motor to be used to operate an electric submersible pump.

11. The method of claim 10, wherein heating the wrapped magnet wire comprises sliding the wrapped magnet wire through an inside of the induction coil.

12. The method of claim 10, wherein the at least partial vacuum is created inside the tube by a vacuum pump coupled to an inside of the tube.

13. The method of claim 12, wherein the at least partial vacuum is in a space between the wrapped magnet wire and an inner diameter of the tube.

14. The method of claim 10, further comprising closing an end of the tube with a rubber plug to at least partially prevent air from entering the tube.

15. The method of claim 10, wherein winding the enhanced magnet wire into the induction motor further comprises winding the enhanced magnet wire through open slots of a stator of the induction motor, wherein the open slots have empty space around the enhanced magnet wire.

16. The method of claim 15, further comprising cooling the induction motor by convection by allowing motor oil to flow through the empty space in the open slots around the enhanced magnet wire.

17. The method of claim 10, further comprising:
prior to pulling the magnet wire,
drawing the magnet wire to size; and
cleaning the magnet wire.

* * * * *